Sept. 22, 1942.  M. MORGAN ET AL  2,296,683
COIL HANDLING APPARATUS
Filed Feb. 15, 1939   6 Sheets-Sheet 1

Fig. 1

INVENTORS
MYLES MORGAN
LEONARD W. NASH
BY Albert G. Blodgett
ATTORNEY

Sept. 22, 1942.　　　M. MORGAN ET AL　　　2,296,683
COIL HANDLING APPARATUS
Filed Feb. 15, 1939　　　6 Sheets-Sheet 4

INVENTORS
MYLES MORGAN
LEONARD W. NASH
BY Albert G. Blodgett
ATTORNEY

Sept. 22, 1942. M. MORGAN ET AL 2,296,683
COIL HANDLING APPARATUS
Filed Feb. 15, 1939 6 Sheets-Sheet 5

INVENTORS
MYLES MORGAN
LEONARD W. NASH
BY Albert G. Blodgett
ATTORNEY

Sept. 22, 1942.   M. MORGAN ET AL   2,296,683
COIL HANDLING APPARATUS
Filed Feb. 15, 1939   6 Sheets-Sheet 6

INVENTORS
MYLES MORGAN
LEONARD W. NASH
BY Albert G. Blodgett
ATTORNEY

Patented Sept. 22, 1942

2,296,683

UNITED STATES PATENT OFFICE 2,296,683

COIL HANDLING APPARATUS

Myles Morgan, Worcester, Mass., and Leonard W. Nash, Damascus, Ohio, assignors to Morgan Construction Company, Worcester, Mass., a corporation of Massachusetts and to E. W. Bliss Company, Brooklyn, N. Y., a corporation of Delaware Application February 15, 1939, Serial No. 256,534

4 Claims. (Cl. 80—43)

This invention relates to coil handling apparatus, and more particularly to an improved apparatus for transferring coils of rolled metal strip from a coiling mechanism at the delivery side of a roll stand to the inlet side of the roll stand for a second pass between the rolls.

In many cases these coils are very happy, and in order to facilitate their handling and at the same time protect them from damage it has been proposed heretofore to form the coils on flanged metal spools which are supported, during the coiling operation, on a horizontal rotatable arbor located at the delivery side of the rolling mill. After a coil is completed and removed from the arbor it is necessary to place an empty spool upon the arbor before the next coil can be started. This pause in the rolling operation results in a substantial reduction in the capacity of the rolling mill and increases the cost of the manufactured product. The spools are necessarily of very rugged construction, and their cost is considerable. Moreover, it has been found necessary to utilize power driven conveyors to transfer the filled spools from one side of the mill to the other. Since these conveyors must be of great length in order to provide sufficient storage capacity for the coils between successive reductions, they are very expensive to manufacture and install, and they require considerable power for their operation. After completion of the rolling it is necessary to re-wind the coils in order to separate them from the spools.

It is accordingly one object of the invention to provide a comparatively simple, inexpensive and efficient apparatus for handling metal coils for the purpose of obtaining successive reductions in the thickness of metal strip by rolling.

It is a further object of the invention to provide an apparatus whereby successive reductions in the thickness of metal strip by rolling may be facilitated, and whereby the metal may be handled safely and efficiently after each reduction without utilizing spools.

It is a further object of the invention to provide an apparatus whereby metal strip may be returned to a roll stand for successive reductions in thickness by rolling followed by coiling, and whereby ample storage capacity may be obtained for the coils between reductions, all without utilizing long power driven conveyors.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts.

The embodiment illustrated comprises a horizontal rolling mill 20 suitably constructed to reduce the thickness of flat metal strip, this mill being preferably of the four-high type. The strip is delivered to the mill in the form of hollow cylindrical coils. In order to support these coils while they are being unwound there is provided at the inlet side of the mill a suitable horizontal arbor 21 which is rotatably supported in suitable bearings in a frame 22. The arbor overhangs the frame so that the coils can be readily mounted thereon. It is usually desirable to apply a back tension to the strip as it is being rolled. For this purpose the arbor 21 is preferably of the expanding type adapted to grip tightly against the inner surface of the hollow coil, and a suitable brake 23 (Fig. 8) is applied to the arbor shaft to resist turning thereof as the coil is unwound. The arbor may be expanded and contracted in a well-known manner by means of a suitable fluid-actuated reciprocating motor 24.

Figure 1:
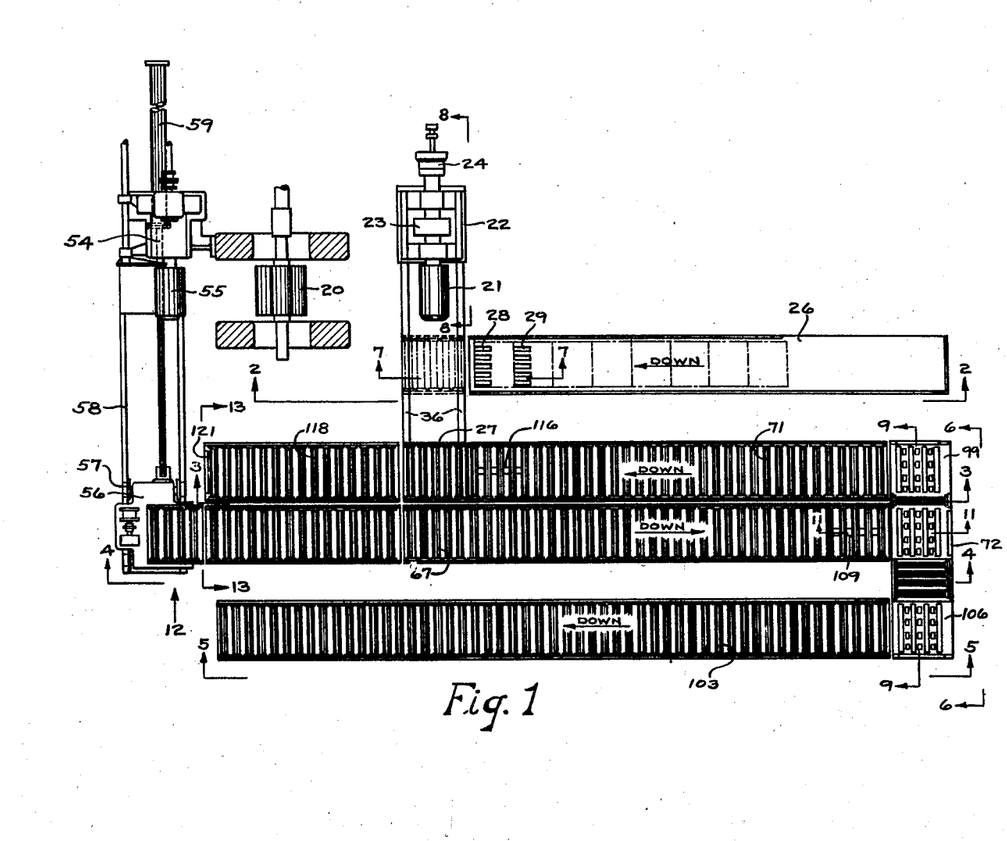
Fig. 1 is a top plan view of a rolling mill and associated apparatus, the mill housing being shown in horizontal section.
Figure 2:
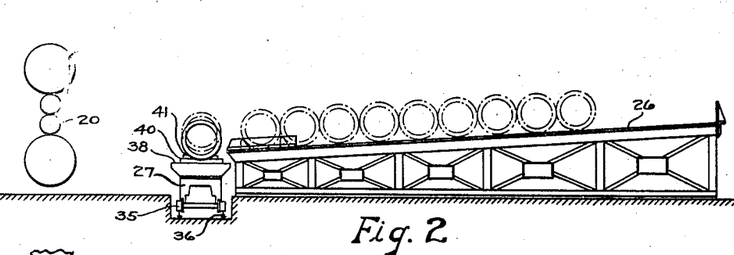
Fig. 2 is a section taken on the line 2—2 of Fig. 1.

The coils may be delivered to the arbor 21 by any suitable means. In the drawings there is shown an inclined chute 26 down which the coils may roll, with their axes parallel to the axis of the arbor. As shown in Fig. 1, the chute 26 is offset horizontally from the arbor so that the coils may roll from the lower end of the chute on to a transfer car 27 arranged to move them axially and place them upon the arbor. In Fig. 1 the receiving position of the car is indicated by the broken lines. In order to control the escape of the coils from the chute, a set of dogs 28 is provided at the lower end of the chute, and a second set of dogs 29 is spaced upwardly along the slope from the first set. Both sets of dogs are pivotally mounted on the chute, as shown particularly in Fig. 7, so that they may be swung upwardly into the path of the coils or downwardly out of the path of the coils, and the two sets are spaced apart a distance approximating the outside diameter of the coils. The lower dogs 28 are controlled by a fluid-actuated reciprocating motor 30 and suitable mechanical linkage 31, and the upper dogs 29 are controlled by a fluid-actuated reciprocating motor 32 and suitable mechanical linkage 33. It will be apparent that by lowering the dogs 28 while the dogs 29 are raised, and vice versa, the coils may be delivered one at a time to the transfer car 27.

Figure 7:
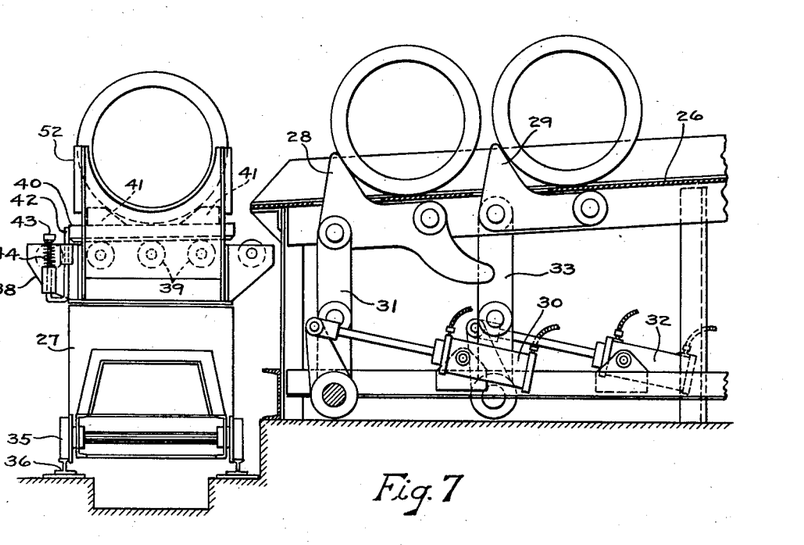
Fig. 7 is an enlarged section taken on the line 7—7 of Fig. 1.
Figure 8:
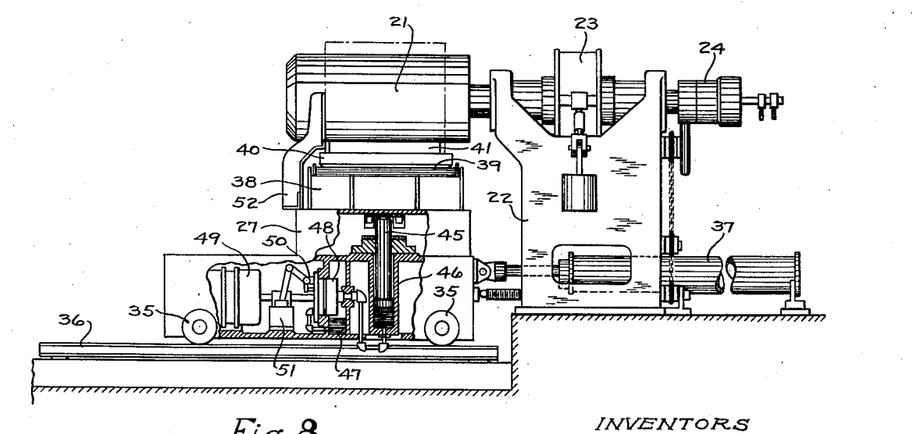
Fig. 8 is an enlarged section taken on the line 8—8 of Fig. 1, with certain parts in a different position.

Referring now to Figs. 7 and 8, it will be seen that the car 27 is provided with wheels 35 which engage a pair of rails 36 forming a track along which the car may be moved by means of a fluid-actuated reciprocating motor 37. At the top of the car there is provided a table 38 having a series of horizontal rollers 39 thereon wtih their axes parallel to the arbor 21. The rollers are arranged successively at slightly lower elevations to provide an upper surface inclined downwardly from the chute 26, for a purpose which will subsequently be made clear. The rollers 39 support a sled 40 having a flat bottom and a pair of spaced parallel cleats or upstanding ribs 41 on its upper surface arranged to provide a trough in which a coil may rest. This sled engages the outer cylindrical surface of the coil, and it is preferably made of wood so that no scratching or marring of the coil will occur. In order to retain the sled in place despite the sloping arrangement of the rollers, a stop 42 is provided to engage the sled at the lower side thereof, as shown in Fig. 7. This stop may be withdrawn by a vertically slidable pin 43 which is normally held in its upper position by a spring 44. The table 38 is arranged to be raised and lowered as desired, and for this purpose it is supported by a vertical plunger 45 which slides in a cylinder 46 in the car 27. The car is also provided with an oil reservoir 47, a pump 48 and a motor 49 to drive the pump. By starting the motor and pump, oil from the reservoir can be forced into the cylinder 46, raising the plunger 45 and the table 38. The lowering of the table is effected by exhausting oil from the cylinder under the control of a suitable valve mechanism 50 actuated by a solenoid 51. On the front of the table 38 there is provided a bracket 52 adapted to engage the outer end of the coil and ensure its proper disposition on the arbor 21. It will be apparent that after a coil has been placed upon the arbor the table 38 will be lowered slightly and the car 27 will be moved outwardly along the track 36 and into line with the chute 26, so that another coil may be delivered to the car.

After the metal strip has been reduced in thickness by the mill 20 it is again formed into a hollow cylindrical coil, which preferably has substantially the same inside and outside diameters as the original coil. For this purpose there is provided at the outlet or discharge side of the mill a coiling mechanism 54 (Figs. 1 and 4) of any suitable and well-known construction. This coiler 54 comprises a horizontal rotatable arbor 55 driven by a suitable source of power and arranged to maintain a tension in the strip issuing from the mill while winding the strip into a tight coil. This arbor is preferably of the over-hung collapsible type. In order to remove the completed coils from the arbor 55 there is provided a transfer car 56 similar to the car 27 and equipped with wheels 57 which engage spaced parallel rails 58 forming a track. The car 56 may be moved back and forth along this track by means of a fluid-actuated motor 59 (Fig. 1). At the top of the car 56 there is provided a table 60 which supports a frame 61 having rollers 62 mounted therein with their axes parallel to the mill rolls 20. The table 60 can be raised and lowered as desired by suitable means (not shown) which may be similar to the mechanism utilized on the car 27 for actuating the table 38. The frame 61 is secured to the table 60 by means of aligned pivot pins 64 (Fig. 12) with their axes parallel to the axes of the rollers 62, so that the frame may swing through a slight angle about the pins. In this manner the surface afforded by the tops of the rollers can be made to incline slightly downward to either side of the car. Normally this surface is made to incline downwardly toward the side of the car opposite that on which the mill 20 is located, and a fixed stop 65 is provided on that side of the frame 61 to retain the sleds 40 in position thereon. To discharge the sleds from the car 56, means is provided to tilt the frame 61 in the opposite direction when the car is moved into alignment with a gravity conveyor 67 (Figs. 1 and 4) of the idler roller type which slopes downwardly from the frame 61. This conveyor is located on the same side of the car 56 as the mill 20, and extends at right angles with the track 58. For the purpose of tilting the frame 61 there is provided a cam roller 68 (Figs. 12 and 13) on the frame arranged to engage a stationary cam 69 located at the upper end of the conveyor 67. The conveyor 67 is preferably of considerable length so that it may provide storage space for a large number of coils, each carried on a supporting sled.

Means is provided to return the coils from the lower end of the conveyor 67 to the inlet side of the rolling mill, and for this purpose there is provided a second gravity conveyor 71 of the idler roller type arranged parallel with the conveyor 67 and at the side thereof toward the mill. The upper end of the conveyor 71 is laterally adjacent to the lower end of the conveyor 67 but at a higher elevation, and the two conveyors slope in opposite directions. The lower end of the conveyor 71 is so located that the transfer car 27 may be moved into line therewith, as shown in Fig. 1.

In order to transfer the loaded sleds from the conveyor 67 to the conveyor 71 there is provided an elevating mechanism 72 located at the lower end of the conveyor 67 and in line therewith. This elevator comprises a table 73 (Fig. 9) which can be raised or lowered as desired by means of a vertical plunger 74 of the fluid-actuated type. The oil for actuation of the plunger may be supplied by a pump 75 driven by a motor 76, the motor being operated in the reverse direction when the elevator is to be lowered. The table 73 is provided with a pair of upstanding transverse webs 78, (Figs. 9, 10 and 11) extending at right angles to the conveyor 67, and each formed with two vertical slots 79. Above the table 73 there is provided a platform 80 having a pair of depending transverse webs 81 each formed with two horizontal slots 82. At assembly the webs 81 are located adjacent the webs 78, and horizontal rods or bolts 83 are passed through the slots 79 and 82. With this construction the platform 80 is allowed a limited lost motion relative to the table 73, not only transversely thereof but also vertically, for a purpose which will be made clear hereinafter. The platform 80 serves to support a plate 85 having several spaced parallel upstanding webs 86 thereon which extend at right angles to the conveyor 67. On each of the webs 86 there is mounted a row of short rollers 87 arranged with their axes in line with the conveyor 67. Between the rows of short rollers 87 there are provided long transverse rollers 88, at right angles with the short rollers, and journaled at their ends in a rectangular frame 89 which surrounds the webs 86 and normally rests upon the plate 85. These parts are so constructed and arranged that when the elevator is lowered to receive a loaded sled from the conveyor 67, the frame 89 will rest upon fixed stops 90 (Fig. 11) and the plate 85 will be lowered below the frame so that the long rollers 88 will be held above the short rollers 87 to form in effect an inclined continuation of the conveyor 67. After the loaded sled is in place on the rollers 88, the elevator will be raised, bringing the short rollers 87 upwardly to support the sled, while the frame 89 is carried upwardly by the plate 85, with the rollers 88 below and out of contact with the sled.

Figure 9:
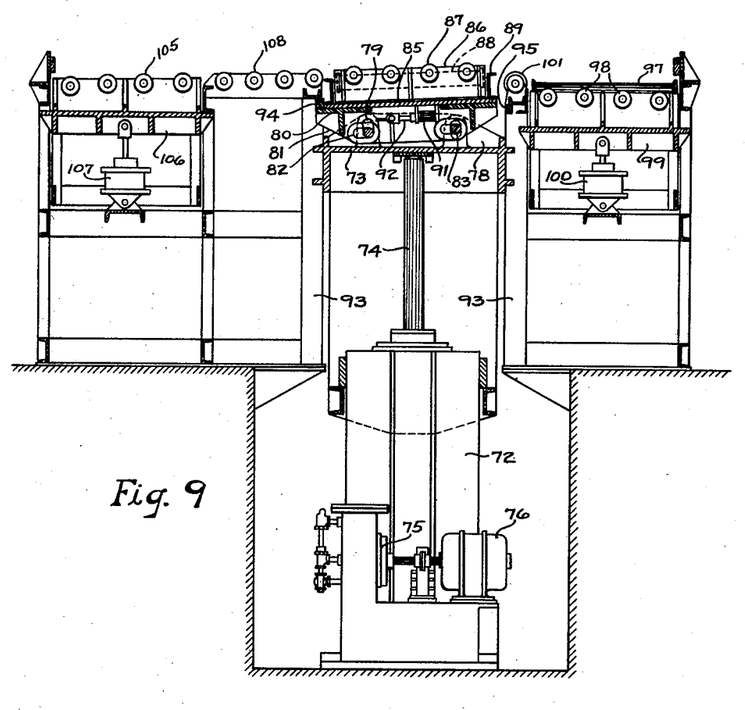
Fig. 9 is an enlarged section taken on the line 9—9 of Fig. 1.
Figure 10:
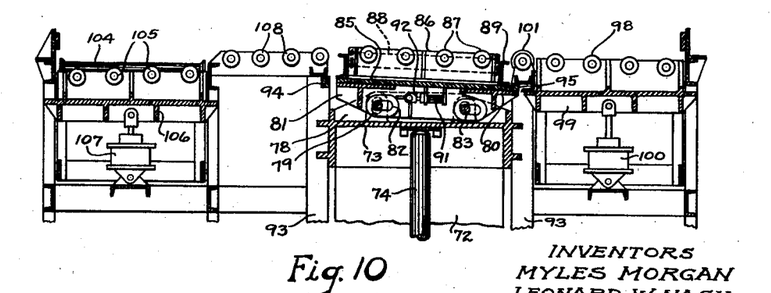
Fig. 10 is a view similar to Fig. 9 but showing the parts in a different position of adjustment.
Figure 11:
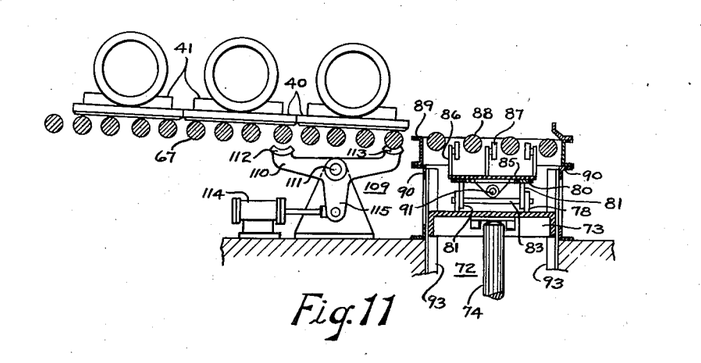
Fig. 11 is an enlarged section on the line 11—11 of Fig. 1, showing the elevating mechanism in its lowered position.

As the elevator 72 approaches its uppermost position, the plate 85 is tilted laterally in order to discharge the sled by gravity from the rollers 87. Furthermore, the plate can be tilted in either direction, so that the coil can be returned to the rolling mill if further reduction is required, or it can be discharged in the opposite direction when the rolling has been completed. For this purpose a double-acting fluid-actuated motor 91 is secured to the bottom of the plate 85, this motor having a horizontal piston rod 92 which is connected to the platform 80. Lateral movement of the plate 85 is limited by vertical guides 93, and it follows that the motor 91 can be used to move the platform 80 laterally in either direction to the extent allowed by the horizontal slots 82. On opposite sides of the elevator there are provided fixed stops 94 and 95 so located that as the elevator approaches its uppermost position the lateral portion of the platform will engage one or the other of these stops, and the platform will be tilted about the nearest bolt 83 as a fulcrum, as shown in Figs. 9 and 10.

At the upper end of the conveyor 71 and at one side of the elevator 72 there is provided a set of spaced idler rollers 97 with their axes parallel with the rollers of the conveyor. The rollers 97 in effect form a continuation of the conveyor 71 sloping upwardly at the same inclination. Between the rollers 97 there are provided rows of short idler rollers 98 arranged with their axes perpendicular to the axes of the rollers 97. These short rollers 98 are journaled on a table 99 which can be raised or lowered by means of a single-acting fluid-actuated motor 100 therebeneath, whereby the rollers 98 may be positioned either above or below the rollers 97. When these rollers 98 are raised, they preferably provide a sled-supporting surface which slopes downwardly away from the elevator 72. Between the elevator and the table 99 there is provided a single idler roller 101 parallel to the rollers 87 and 98.

On the opposite side of the conveyor 67 from the rolling mill 20 there is shown a third gravity conveyor 103 of the idler roller type which is spaced from and parallel to the conveyor 67 but inclines in the opposite direction, (Fig. 1). This third conveyor may serve to transport the finished coils of stock to any desired location. At the upper end of the conveyor 103 and at one side of the elevator 72 there is provided a set of spaced idler rollers 104 with their axes parallel with the rollers of the conveyor. The rollers 104 in effect form a continuation of the conveyor 103 sloping upwardly at the same inclination. Between the rollers 104 there are provided rows of short idler rollers 105 arranged with their axes perpendicular to the axes of the rollers 104. These short rollers 105 are journaled on a table 106 which can be raised or lowered by means of a single-acting fluid-actuated motor 107 therebeneath, whereby the rollers 105 may be positioned either above or below the rollers 104. When these rollers 105 are raised, they preferably provide a sled supporting surface which slopes downwardly away from the elevator 72. Between the elevator and the table 106 there is provided a series of idler rollers 108 parallel to the rollers 87 and 105 and forming a short gravity conveyor leading laterally at a slight downward inclination from the elevator.

Means is provided to control the discharge of the loaded sleds from the conveyor 67 to the elevator 72. For this purpose there is provided an escapement mechanism 109 (Fig. 11) comprising a horizontal lever 110 located beneath the lower end of the conveyor and pivoted centrally on a transverse shaft 111. Brake shoes 112 and 113 are mounted on the opposite ends of the lever and adapted to contact alternately with two of the conveyor rollers as the lever is rocked back and forth. This rocking movement may be imparted to the lever by means of a fluid-actuated motor 114 connected to an arm 115 depending from the lever. The brake shoes are spaced apart a distance slightly exceeding the length of the sleds 40, and the various parts are so constructed and arranged that when the lever is rocked in one direction to lower the brake shoe 113 and allow the discharge of the end sled on to the elevator, the brake shoe 112 will be raised against the roller thereabove to prevent discharge of the second sled in the row. Then after the first sled has been discharged the lever will be rocked back to its original position and the whole row of sleds will advance to the end of the conveyor, where they will be stopped by the braking effect of the shoe 113 on the last conveyor roller.

Means is also provided to control the discharge of the loaded sleds from the conveyor 71 to the transfer car 27, and for this purpose we may utilize an escapement mechanism 116 (Fig. 1) located beneath the delivery end of the conveyor. This mechanism may be similar to the escapement 109 shown in Fig. 11, and it is therefore believed unnecessary to illustrate its construction in detail.

Figures 3, 4, 5:
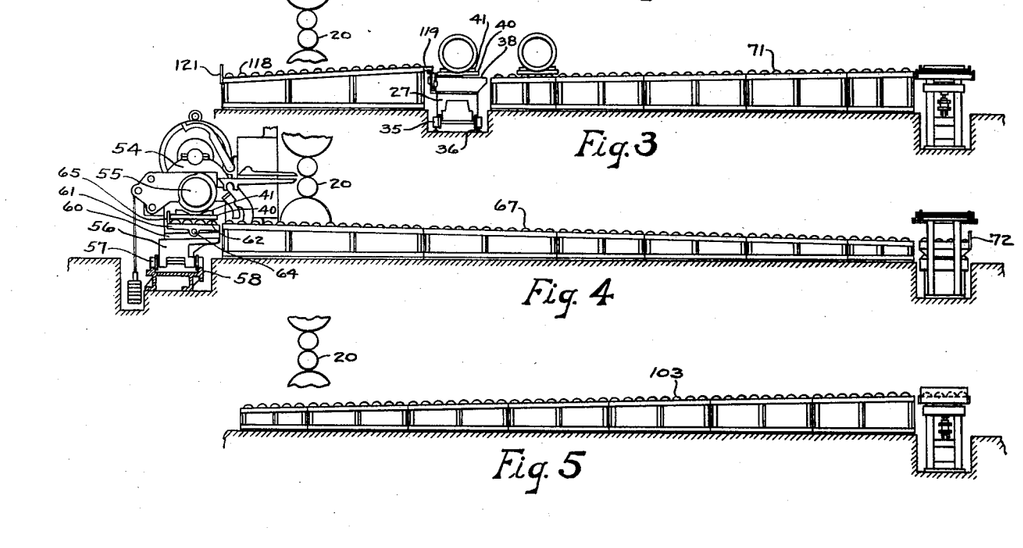
Fig. 3 is a section taken on the line 3—3 of Fig. 1.
Fig. 4 is a section taken on the line 4—4 of Fig. 1.
Fig. 5 is a section taken on the line 5—5 of Fig. 1.
Figure 6:
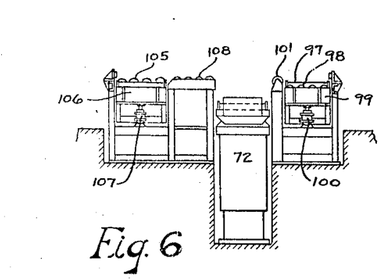
Fig. 6 is a section taken on the line 6—6 of Fig. 1.

After each coil has been transferred from the conveyor 71 to the arbor 21 by means of the car 27, the corresponding sled 40 is placed in a position where it is available for use on the car 56, for removing a coil from the arbor 55. In order to avoid the necessity for manual handling of the empty sleds, we provide a gravity conveyor 118 (Figs. 1 and 3) of the idler roller type which is located between the track 36 and the track 58, in substantial alignment with the conveyor 71. This conveyor 118 slopes downwardly toward the track 58, and its angle of slope is preferably steeper than that of the other conveyors since it handle only empty sleds, which will not move as readily as the loaded sleds. The upper end of the conveyor 118 is somewhat higher than the discharge end of the conveyor 71, as shown in Fig. 3, so that the table 38 of the car 27 must be raised to bring the sled into position for delivery to the conveyor. The parts are so arranged that the upward movement of the table 38, to bring it into line with the conveyor 118, will automatically effect withdrawal of the stop 42 and allow the sled to move on to the conveyor by the action of gravity. This is brought about by the provision of a stationary stop 119 (Fig. 3) which is engaged by the pin 43 as the table 38 approaches the proper position for discharge of the sled.

At the lower end of the conveyor 118 there is provided a stop 121 which serves to hold the empty sleds on the conveyor until the car 56 is ready to receive them. The withdrawal of this stop 121 is preferably effected automatically as the car 56 reaches a position in line with the conveyor while on its way toward the arbor 55, but the stop is not withdrawn when the car passes the conveyor while traveling in the opposite direction. This is brought about by mounting the stop 121 for a vertical sliding movement in suitable guides 122 (Fig. 13), the stop having lugs 123 projecting on opposite sides, these lugs being normally held upwardly against fixed pins 124 by means of coiled springs 125. On the face of the stop 121 there is mounted a dog 127 having an inclined upper surface 128 arranged to lie in the path of the cam roller 68 as the car 56 moves toward the coiler 54, this cam roller serving to force the dog 127 and the stop 121 downwardly and thus cause an empty sled to be discharged from the conveyor 118 to the car. The dog 127 is pivotally secured to the stop 121 by means of a pin 129, and the dog normally hangs from this pin with one side of the dog engaging a pin 130 on the stop 121, this pin serving to prevent the dog from turning in a counterclockwise direction as viewed in Fig. 13. After the car, with an empty sled thereon, has left the conveyor 118, the springs 125 will raise the stop 121 to its operative position. Upon the return movement of the car, with a loaded sled thereon, the cam roller 68 will strike the upper portion of the dog 127 and swing it in a clockwise direction about the pin 129 without moving the stop 121, and after the passage of the cam roller the dog will return to its original position by its own weight.

Figures 14, 15, 16:
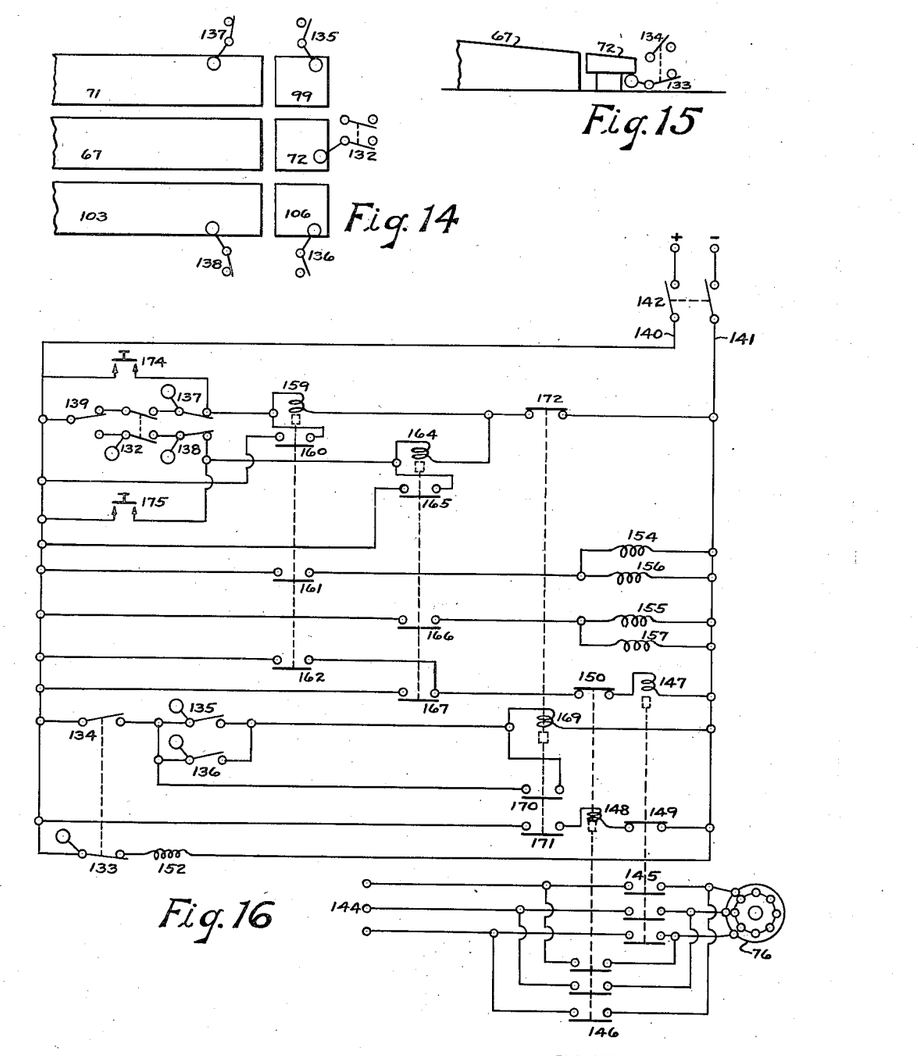
Fig. 14 is a diagrammatic plan view showing the location of certain limit switches.
Fig. 15 is a diagrammatic elevation showing the location of certain limit switches.
Fig. 16 is a diagram of certain electrical circuits.

In many cases it will be found advantageous to provide automatic controls which will bring about the transfer of the loaded sleds successively from the conveyor 67 to the conveyor 71 (or to the conveyor 103 when desired). One suitable arrangement of automatic controls for this purpose is shown diagrammatically in Figs. 14, 15 and 16. On the elevator 72 there is mounted a normally open double pole limit switch 132 which is arranged to be closed by engagement of a loaded sled therewith whenever such a sled is on the elevator. There are also provided a normally open single pole limit switch 133 which is arranged to be closed whenever the elevator is in its lower position, and a normally closed single pole limit switch 134 which is arranged to be opened whenever the elevator is in its lower position. Adjacent the table 99 there is mounted a normally open single pole limit switch 135, and adjacent the table 106 there is provided a similar limit switch 136. Each of the switches 135 and 136 is arranged to be closed by engagement of a loaded sled therewith whenever such a sled is above the corresponding table. Near the upper end of the conveyor 71 there is provided a normally closed single pole limit switch 137, and near the upper end of the conveyor 103 there is provided a similar limit switch 138. Each of the switches 137 and 138 is arranged to be closed by engagement of a loaded sled therewith whenever such a sled is located on the adjacent portion of the corresponding conveyor. A manually actuated selector switch 139 is provided to control the direction (right or left, as viewed in Figs. 9 and 10) toward which the loaded sleds will be discharged from the elevator. This switch 139 is of the single-pole double-throw type and, as shown in Fig. 16, it is connected between the limit switch 132 and a main power lead 140, the other power lead being designated as 141. The current supply to the power leads is controlled by a switch 142.

The elevator motor 76 is supplied with electric current from a source 144 through a pair of normally open three-pole switches 145 and 146 which are actuated by coils 147 and 148 respectively. The coil 147 also controls a normally closed contact 149, and the coil 148 controls a normally closed contact 150. When the switch 145 is closed, by energizing the coil 147, the motor 76 will be operated in a direction to raise the elevator 72, and when the switch 146 is closed, by energizing the coil 148, the motor 76 will be operated in the reverse direction to lower the elevator 72.

The motor 114 which actuates the escapement mechanism 109 (Fig. 11) is controlled by a suitable four-way solenoid valve of well-known type having a solenoid 152 (Fig. 16). These parts are so constructed and arranged that when the solenoid is de-energized, the motor 114 will hold the brake shoe 113 in contact with the roller thereabove, thus preventing delivery of a loaded sled to the elevator, whereas when the solenoid is energized the motor 114 will lower the shoe 113 and raise the shoe 112 thus allowing one loaded sled to move by gravity on to the elevator. The current supply to the solenoid 152 is controlled by the limit switch 133, which is connected in series therewith across the power leads 140—141.

The motor 91 (Figs. 9 and 10), which controls the direction in which the platform 80 will be tipped as the elevator reaches its upper position, is controlled by a suitable four-way solenoid valve of well-known type having two solenoids 154 and 155 (Fig. 16). These parts are so constructed and arranged that when the solenoid 154 is energized the platform 80 will be tipped downwardly to the right, as shown in Fig. 10, when the elevator is raised, whereas when the solenoid 155 is energized the platform will be tipped downwardly to the left, as shown in Fig. 9, when the elevator is raised. The motors 100 and 107 are controlled by suitable three-way solenoid valves having solenoids 156 and 157 respectively (Fig. 16) so arranged that energization of the solenoids will cause the motors to elevate their respective tables 99 and 106. The solenoid 156 is connected in parallel with the solenoid 154, and the solenoid 157 is connected in parallel with the solenoid 155.

In order to control the energization of the various coils and solenoids, we provide a coil 159 arranged to actuate three normally open contacts 160, 161 and 162 and a coil 164 arranged to actuate three normally open contacts 165, 166 and 167. In addition we provide a coil 169 arranged to actuate two normally open contacts 170 and 171, this same coil serving to actuate a normally closed contact 172. The selector switch 139 is connected in series with one pole of the limit switch 132, the limit switch 137, the coil 159 and the contact 172. The selector switch is also connected in series with the other pole of the limit switch 132, the limit switch 138, the coil 164 and the contact 172. The contact 160 is connected in parallel with the selector switch 139, limit switch 132 and limit switch 137, and this contact may be shunted by a normally open push button 174. The contact 165 is connected in parallel with the selector switch 139, limit switch 132 and limit switch 138, and this contact may be shunted by a normally open push button 175. The contact 161 controls the circuit through the solenoids 154 and 156, and the contact 166 controls the circuit through the solenoids 155 and 157. The contacts 162 and 167 are connected in parallel, and control a series circuit through the contact 150 and the coil 147. The contact 170, the limit switch 135 and the limit switch 136 are connected in parallel, and control a series circuit through the limit switch 134 and the coil 169. The contacts 149 and 171 are connected in series with the coil 148.

Figure 12:
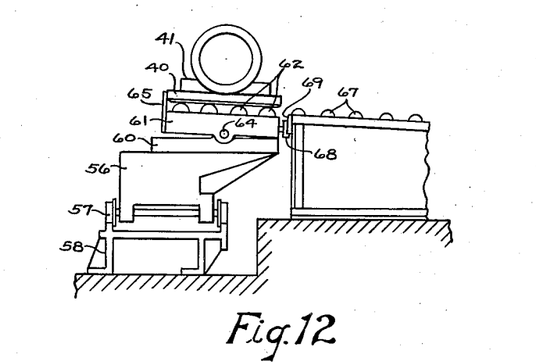
Fig. 12 is an enlarged elevation taken in the direction of the arrow 12 in Fig. 1.
Figure 13:
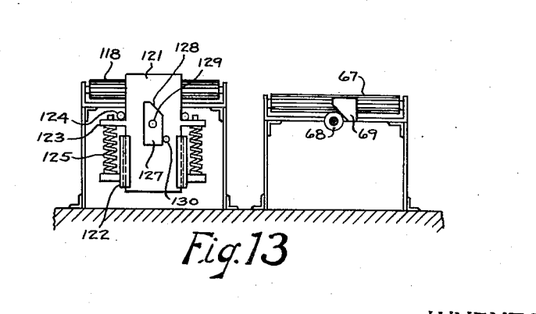
Fig. 13 is an enlarged section on the line 13—13 of Fig. 1.

The operation of the invention will now be apparent from the above disclosure. Coils of metal strip are delivered by any suitable means to the chute 26, and roll down this chute until they are stopped by the dogs 28. The transfer car 27 is moved into line with the chute, a sled 40 is placed on the car, the dogs 29 are raised to hold back the coils thereabove, the dogs 28 are lowered to allow one coil to roll on to the sled. Thereupon the dogs 28 are raised and the dogs 29 lowered, allowing the line of coils to roll downwardly until stopped by the dogs 28. The car 27 is then moved along the track 36, the coil is placed upon the arbor 21, which is expanded to grip the coil, the end of the strip is entered in the mill 20, and the brake 23 is applied. While the strip is passing through the mill, the transfer car 27 may be returned to the chute 26 for the next coil. On issuing from the mill the strip is coiled upon the arbor 55, and as soon as the rear end of the strip leaves the arbor 21 the next coil can be placed thereon. Upon completion of the coil on the arbor 55, the transfer car 56 is moved beneath the coil, an empty sled having first been placed upon the car by hand from a suitable stack of sleds near the track 58. The arbor 55 is then collapsed, the car table 60 is raised until the weight of the coil is supported on the sled, and the car is then moved along the track 58 to bring the coil into line with the conveyor 67. As the car approaches this conveyor, the cam roller 68 will engage the cam 69, and the table 61 will tilt downwardly toward the conveyor, as shown in Fig. 12, discharging the sled and coil on to the conveyor. Immediately after the coil has been removed from the arbor 55, a new strip can be started through the mill, and while this is being rolled another empty sled can be placed on the car 56 in readiness to receive the next coil.

The sled and coil move downwardly by gravity along the conveyor 67 until they reach the end thereof, where they are stopped by the brake 113, which has been applied previously by the opening of switch 142 and the resultant deenergization of solenoid 152. The car 56 will continue to supply loaded sleds to the conveyor 67 until this conveyor is nearly filled, whereupon the switch 142 will be closed, energizing solenoid 152, releasing brake 13, and applying brake 12. The first sled and coil will then roll on to the elevator table rollers 88, closing limit switch 132. With selector switch 139 positioned as shown in Fig. 16 this will energize coil 159, closing contacts 160, 161, and 162. This will energize solenoids 154 and 156 and coil 147, closing switch 145. Solenoid 154 will cause motor 91 to shift platform 80 to the right (in Fig. 10), and solenoid 156 will cause motor 100 to elevate table 99 with rollers 98. Switch 145 will cause motor 76 to raise the elevator table 73, which will raise the short rollers 87 slightly above the long rollers 88, the rollers 87 then serving to support the sled and coil while the upward movement continues. As soon as the elevator has started upwardly, switch 134 will close and switch 133 will open, deenergizing solenoid 152, releasing brake 112, and applying the brake 113. This will allow the loaded sleds on the conveyor 67 to advance to the lower end of the conveyor. As the elevator reaches its uppermost position the right-hand portion of the platform 80 will engage the fixed stop 95, as shown in Fig. 10, and the platform with the rollers 87 will be tipped downwardly to the right. The sled and coil will then move by gravity over the roller 101 on to the rollers 98, opening the limit switch 132 and closing the limit switch 135. While this is taking place, the oil from the elevator pump 75 may be by-passed through a suitable relief valve. Closing of the switch 135 will energize coil 169 and open contact 172, deenergizing coil 159, opening contacts 160, 161 and 162, deenergizing coil 147, opening switch 145, closing contact 149, energizing coil 148 and closing switch 146. The motor 76 will thereupon reverse and start the elevator downwardly. Opening contact 161 will deenergize solenoids 154 and 156, lowering the rollers 98 until the loaded sled rests upon the rollers 97. The sled will then move by gravity on to the conveyor 71 and travel downwardly thereon until stopped by the escapement mechanism 116. As the elevator 72 descends to its lowermost position, the limit switch 133 will close and limit switch 134 will open, and as the sled leaves the table 99 the limit switch 135 will open. This will deenergize coil 169, opening contacts 170 and 171, deenergizing coil 148, and opening switch 146, thus stopping the motor 76. Closing limit switch 133 will energize solenoid 152, thus releasing brake 113 and applying brake 112, whereupon another loaded sled will move on to the elevator. This will continue until the conveyor 71 is filled with loaded sleds, so that the last sled delivered thereto will hold the limit switch 137 open, thereby preventing operation of the elevator. Thereafter the loaded sleds will be allowed to accumulate on the conveyor 67 until all the first "batch" has passed once through the rolling mill.

The rolling mill 20 will now be adjusted to effect a further reduction in the thickness of the strip. The car 27 will be moved into line with the conveyor 71, and the escapement mechanism 116 will be operated under manual control to allow one loaded sled to move downwardly on to the car. The car will then be moved along the track 36 to place the coil upon the arbor 21, whereupon the car with the empty sled will return to its former position between the conveyors 71 and 118. The car table 38 will now be raised until the pin 43 engages the fixed stop 119 (Fig. 3), and this will effect withdrawal of the stop 42 and allow the empty sled to move downwardly along the conveyor 118 to the stop 121. The table 38 will then be lowered to receive another loaded sled from the conveyor 71. In the meantime, the metal strip in the first coil is passing through the mill and being recoiled on the arbor 55. As the transfer car 56 moves along the track 58 to remove the completed coil from this arbor, the cam roller 68 will engage the sloping surface 128 on the dog 127 and force the dog and the stop 121 downwardly against the pressure of the springs 125, thus allowing the empty sled to move by gravity from the conveyor 118 to the car table 61. This sled will then be used to support the coil. This mode of operation will continue until all the coils have received their second reduction and are assembled on the conveyors 67 and 71, whereupon the mill 20 will be readjusted for a third reduction.

From the foregoing it will be apparent that the coils may be given any desired number of reductions, and because of the large storage facilities afforded by the conveyors it is possible to roll the coils in large batches, thus decreasing the cost of manufacture. As soon as the first coil has received its final reduction and reaches the brake 113, the operator will throw the selector switch 139 to the position opposite that shown in Fig. 16. Thus the coil 164 will be controlled instead of the coil 159, and the solenoids 155 and 157 will be controlled instead of the solenoids 154 and 156. Consequently when the elevator reaches its uppermost position the rollers 87 will be tipped downwardly to the left, as shown in Fig. 9, and the loaded sled will move across the rollers 108 to the rollers 105, which will be lowered automatically until the sled rests upon the rollers 104, whereupon the sled will travel along the conveyor 103 to any desired location. It will be understood that the limit switches 136 and 138 will function in a manner similar to the limit switches 135 and 137, so that a further detailed description of their operation is believed to be unnecessary. The purpose of the push buttons 174 and 175 is to permit manual control of the elevator and associated parts, thereby facilitating inspections and lubrication.

It will be seen that the mill 20 can be maintained in substantially continuous operation, for as soon as one coil is completed and removed from the arbor 55 the rolling of the next coil can begin. The wooden sleds 40 are light and inexpensive, and they will not mar or scratch the coils. Nor do the coils have to be unwound to remove them from the sleds, as is the case when spools are utilized for coil supports. The gravity conveyors are much less expensive than power driven conveyors, both in initial cost and in the cost of operation. In addition, they are more reliable.

Having thus described our invention, what we claim as new and desire to secure by Letters Patent is:

1. Coil handling apparatus for a rolling mill having means to form metal strip delivered by the mill into hollow cylindrical coils and a series of sleds arranged to support the coils with their axes substantially horizontal by engaging the outer cylindrical surfaces of the coils from beneath the same, each sled having a substantially flat bottom and an upper surface shaped to form a trough for the reception of a coil therein, comprising an inclined gravity conveyor of the idler roller type, means to transfer sleds with coils thereon from the coil forming means to the upper end of the conveyor, a second inclined gravity conveyor of the idler roller type arranged with its upper end adjacent to the lower end of the first conveyor but at a higher elevation, means including an elevator to transfer sleds with coils thereon from the lower end of the first conveyor to the upper end of the second conveyor, and means to transfer sleds with coils thereon from the lower end of the second conveyor to the inlet side of the rolling mill, the two conveyors having sufficient length to provide storage space for a substantial number of loaded sleds, whereby the coils may be rolled in batches.

2. Coil handling apparatus for a rolling mill having means to form metal strip delivered by the mill into coils and a series of sleds adapted to support the coils by engaging the outer surfaces thereof comprising an inclined gravity conveyor of the idler roller type extending substantially parallel with the direction of stock travel through the mill, a track at right angles with the conveyor and extending from the coiling mechanism to the upper end of the conveyor, a car movable on the track to transfer the sleds with the coils thereon to a position in line with the conveyor, the car having a table provided with idler rollers extending parallel with the track and forming a support for the sleds, and means to tilt the table laterally and cause it to slope downwardly toward the conveyor as the table reaches the conveyor, whereby the loaded sleds will be placed upon the conveyor.

3. Coil handling apparatus for a rolling mill having means to form metal strip delivered by the mill into coils and a series of sleds adapted to support the coils by engaging the outer surfaces thereof comprising a track extending from the coiling mechanism, a car movable on the track and having a table provided with idler rollers extending parallel to the track and forming a support for the sleds, a gravity conveyor of the idler roller type extending at right angles with the track and inclined downwardly therefrom, a second gravity conveyor of the idler roller type extending at right angles with the track and inclined downwardly theretoward, the second conveyor being located at the same side of the track as the first conveyor and between the latter and the rolling mill, means to tilt the table laterally and cause it to slope downwardly toward the first conveyor when in line therewith and downwardly away from the second conveyor when in line therewith, and mechanism to transfer loaded sleds from the first conveyor to the inlet side of the rolling mill and to return the empty sleds to the second conveyor.

4. Coil handling apparatus for a rolling mill having means to form metal strip delivered by the mill into coils and a series of sleds arranged to support the coils from beneath the same and having flat bottom surfaces comprising an inclined gravity conveyor of the idler roller type, means to transfer the loaded sleds to the upper end of the conveyor, a second inclined gravity conveyor of the idler roller type parallel with the first conveyor but sloping in the opposite direction, the upper end of the second conveyor being located adjacent to the lower end of the first conveyor but at a higher elevation, a third inclined gravity conveyor of the idler roller type parallel with the first conveyor but sloping in the opposite direction relative thereto, the third conveyor being located on the opposite side of the first conveyor from the second conveyor, the upper end of the third conveyor being located adjacent to the lower end of the first conveyor but at a higher elevation, an elevator arranged to receive loaded sleds from the lower end of the first conveyor, selectively operable means to transfer the loaded sleds from the elevator to either the second or the third conveyors as desired, and means to transfer the loaded sleds from the lower end of the second conveyor to the inlet side of the rolling mill.

MYLES MORGAN.
LEONARD W. NASH.

CERTIFICATE OF CORRECTION.

September 22, 1942.

Patent No. 2,296,683.

MYLES MORGAN, ET AL.

It is hereby certified that error appears in the printed specification of the above numbered patent requiring correction as follows: Page 1, first column, line 7, for "happy" read --heavy--; page 5, second column, line 12, for "releasing brake 13, and applying brake 12" read --releasing brake 113, and applying brake 112--; and that the said Letters Patent should be read with this correction therein that the same may conform to the record of the case in the Patent Office.

Signed and sealed this 27th day of October, A. D. 1942.

Henry Van Arsdale,
Acting Commissioner of Patents.

(Seal)